United States Patent [19]

Dubrow et al.

[11] Patent Number: 4,859,715

[45] Date of Patent: Aug. 22, 1989

[54] MICROPOROUS POLY (ARYLETHER KETONE) ARTICLE

[75] Inventors: Robert S. Dubrow, Redwood City; Michael F. Froix, Los Altos, both of CA

[73] Assignee: Raychem Corporation, Menlo Park, Calif.

[21] Appl. No.: 119,140

[22] Filed: Nov. 10, 1987

Related U.S. Application Data

[60] Division of Ser. No. 858,484, Apr. 30, 1986, Pat. No. 4,721,732, which is a continuation-in-part of Ser. No. 611,665, May 18, 1984, abandoned.

[51] Int. Cl.$^4$ .............................................. C08J 9/26
[52] U.S. Cl. ............................... 521/180; 210/500.21; 210/500.27; 521/61; 521/62; 525/434; 525/436; 525/928
[58] Field of Search ............... 521/61, 64, 62, 63, 521/180; 525/436, 434, 928

[56] References Cited

U.S. PATENT DOCUMENTS

| | | | |
|---|---|---|---|
| 4,176,222 | 11/1979 | Cinderey et al. | 528/108 |
| 4,293,670 | 10/1981 | Robeson et al. | 525/906 |
| 4,359,501 | 11/1982 | DiTullio | 428/245 |
| 4,503,168 | 3/1985 | Hortsing, Jr. | 528/128 |
| 4,714,725 | 12/1987 | Hendy et al. | 521/64 |
| 4,755,540 | 7/1988 | Blakey | 521/61 |

FOREIGN PATENT DOCUMENTS 1471171  4/1977  United Kingdom .

*Primary Examiner*—Morton Foelak
*Attorney, Agent, or Firm*—Yuan Chao; Edith A. Rice; Herbert G. Burkard

[57] ABSTRACT

This invention provides a method for the preparation of an article from a blend of at least two molecularly compatible polymers by treating the blend with a solvent which is a solvent for one of the polymers and a non-solvent for the other. The solvent can be removed while the article is restrained from undergoing substantial shrinkage, in which case a microporous article is obtained. Alternatively, the solvent can be removed while the article is permitted to shrink. In this case high shrinkage force (also referred to as recovery force) results which can be utilized to apply the article to a substrate. The final and intermediate articles are novel. In a preferred embodiment, the invention provides a microporous article having an average pore size of about 0.005 microns to about 1 micron.

3 Claims, No Drawings

MICROPOROUS POLY (ARYLETHER KETONE) ARTICLE

CROSS-REFERENCE TO RELATED APPLICATIONS

This application is a divisional of application Ser. No. 06/858,484, filed Apr. 30, 1986 now U.S. Pat. No. 4,721,732, which in turn is a continuation-in-part of application of Ser. No. 06/611,665, label filed May 18, 1984, now abandoned, the disclosures of which are incorporated herein by reference.

BACKGROUND OF THE INVENTION (a) Field of the Invention

This invention relates to methods for making polymeric articles and to the resulting aticles. In particular it relates to a method of making a polymeric article from a blend comprising at least two polymers which are molecularly compatible and treating the article with a solvent.

(b) Information Disclosure

It is well known that most polymers are generally incompatible with each other. Most blends of two or more polymers containe the separate polymers as individual component domains or phases. Thus blends of what are termed compatible polymers generally are mechanically compatible only and exhibit properties which vary widely over the concentration range of the polymers. Such blends comprise a matrix polymer containing the other polymer as a dispersed or co-continuous phase. Such dispersed phases can be microscopic in size sometimes giving the resulting blend of multiple phases the appearance of being a single phase. There are, however, a few pairs of polymers which are molecularly compatible, that is they form a molecularly dispersed mixture comprising a single amorphous phase when they are blended together. Not only do such blends not separate into their individual amorphous components, but they are also characterized by having a single glass transition temperature (Tg). Mechanically compatible blends, on the other hand, exhibit two or more Tg's characteristic of the Tg's of the individual components. By the term glass transition temperature is meant the temperature at which an amorphous polymer or the amorphous regions of a partially crystalline polymer changes to or from a hard and relatively brittle state to a more flexible or rubbery condition. Measurement of glass transition temperatures of polymer systems is described, for example, in *Thermal Characterization Techniques*, Slade, et al., Marcel Dekker, Inc., New York (1970).

As mentioned above, very few polymeric blends are known wherein two or more polymers exhibit molecular compatibility. Reported in the literature are three basic classifications of compatible polymers represented by the following polymer pairs: poly(vinylidenefluoride) and poly(methyl methacrylate), poly(vinyl chloride) and poly(caprolactone), and poly(styrene) and poly-(phenyleneoxide). For examples of these type of compatible blends see *Polymer Handbook*, 2nd edition, Brandrup, et al. page III 211–213 which is incorporated herein by reference.

Blends of polyetherimides and poly(aryl ethers) are described in U.S. Pat. No. 4,293,670 to Robeson et al. incorporated herein by reference. The only specific blends reported in the patent are blends of a poly(aryl ether sulfone) and a poly(etherimide). Such blends exhibit mechanical compatibility with each blend having more than one glass transition temperature. Blends of a poly(etherimide) and a poly(aryl ether ketone) are discussed in general terms and no specific blend of a poly(aryl ether ketone) and a polyetherimide is reported. There is no mention that blends of these components would be molecularly compatible and therefore different from the poly(aryl ether sulfone)/polyetherimide blends specifically described.

Microporous articles prepared by blending one polymer with a pore forming additive which is then leached out, generally have pore sizes considerably larger than the pore sizes of the articles of this invention. When a polymer is utilized as the pore forming component to be leached from the polymer system, it had been thought that the polymers used should be at least partially incompatible. This is taught, for example, in U.S. Pat. No. 3,544,489 to Dowbenko, et al. In the Dowbenko, et al. patent a composition comprising a thermosetting resin and a solvent extractable thermoplastic resin are applied to a substrate, the thermosetting resin is cured resulting in the formation of minute discrete particles of the thermoplastic resin in the thermoset resin matrix. The thermoplastic is then extracted using a suitable solvent.

In U.S. Pat. No. 3,375,208, Duddy teaches the formation of microporous materials by treating a thermoplastic resin composition with a solvent which comprises intimately mixing under heat and pressure a particulate thermoplastic resin which is insoluble in said solvent with a substantially incompatible particulate thermoplastic resin which is soluble in said solvent to soften the resin into a plasticized mass, shaping the mass and thereafter contacting the shaped mass with said solvent to remove substantially all of the soluble thermoplastic resin and thereby render the insoluble thermoplastic rsin microporous. It is specifically stated in U.S. Pat. No. 3,375,208 that it is the incompatibility of the resins and the intimate milling and blending thereof which results in a porous material having thread-like pores of capillary size.

In U.S. Pat. No. 4,096,099 to Koyama, et al., a porous film having fine cylindrical holes from 70 to 2000 A in diameter is disclosed. The resin film is prepared by treating a film of an AB or ABA type copolymer to decompose the copolymer to remove one of the components. It is clear that the polymer components used to make the block copolymers are incompatible with each other. Thus, the patentees resort to the use of block copolymers to obtain a microporous article in the desired film followed by decomposition of the block copolymer.

SUMMARY OF THE INVENTION

It has been discovered that useful articles can be prepared from a blend of at least two molecularly compatible polymers by treating the blend with a solvent which is a solvent for one of the polymers and a nonsolvent for the other. The resulting article is microporous, if the solvent is removed while restraining the article from shrinking. If the article is not restrained from shrinking, the force of shrinkage (recovery force) can be utilized to apply the article to a substrate. Depending on the degree of shrinkage permitted, the article may or may not be microporous.

On aspect of the invention comprises a method for preparing an article which comprises (a) forming a blend comprising a first polymer and a second polymer which are molecularly compatible with each other;
(b) forming the polymer blend into a shaped article of predetermined dimensions; and
(c) treating the shaped article with a solvent which is a non-solvent for one of the molecularly compatible polymers and a solvent for the other.

Another aspect of this invention comprises a microporous article comprising a poly(aryl ether ketone), said article having an average pore size of about 0.005 to about 1 micron.

Yet another aspect of this invention comprises a microporous article which comprises a blend comprising a first polymer and a second polymer which are molecularly compatible with each other, from which blend at least a substantial part of the second polymer has been solvent extracted.

Yet a further aspect of this invention comprises a high recovery force, shrinkable article comprising a blend comprising a first polymer and a second polymer which are molecularly compatible with each other, and a solvent in contct with said blend, said solvent being a solvent for one of the molecularly compatible polymers and a non-solvent for the other.

A further aspect of this invention comprises a method of recovering a high recovery force article about a substrate comprising:
(a) placing a shaped article formed from a blend of a first polymer and a second polymer which are molecularly compatible with each other around a substrate the article is to be attached to or cover;
(b) treating the article with a solvent which is a non-solvent for one of the molecularly compatible polymers and a solvent for the other;
(c) removing the solvent from the shaped article causing the article to recover.

DETAILED DESCRIPTION OF THE INVENTION

The polymer systems utilized in accordance with this invention are blends comprising two or more polymers which are molecularly compatible with each other. Relatively few blends of this type are known and as the science of polymer blends develops others may be discovered that are also within the scope of this invention. The process of making an article of this application is applicable to any blend of two or more molecularly compatible polymers. Current known molecularly compatible classes of polymers comprise the following representative pairs:
(1) poly(vinylidene fluorides) and poly(methyl methacrylates) and other poly(ester methacrylates);
(2) poly(vinyl chlorides) and poly(caprolactones);
(3) poly(styrenes) and poly(phenylenes) oxide; and
(4) polyetherimide and poly(aryl ether ketones)
and the molecularly compatible co-polymers of the above polymers. The use, in this application, of the generic term for a polymer, e.g. polyvinylidene fluoride, covers homopolymers and copolymers of the specified polymer.

Of particular interest are microporous articles formed from a blend of a poly(aryl ether ketone) and a poly(etherimide). The term poly(aryl ether ketone) refers to polymers having the repeat unit of the formula

wherein Ar and Ar' are aromatic moieties at least one of which containing a diaryl ether linkage forming part of the polymer backbone and wherein both Ar and Ar' are covalently linked to the carbonyl groups through atomatic carbon atoms.

Preferably, Ar and Ar' are independently selected from substituted and unsubstituted phenylene and substituted and unsubstituted polynuclear aromatic moieties. The term polynuclear aromatic moieties is used to mean aromatic moieties containing at least two aromatic rings. The rings can be fused, joined by a direct bond or by a linking group. Such linking groups include for example, carbonyl, ether sulfone, sulfide, amide, imide, azo, alkylene, perfluoroalkylene and the like. As mentioned above, at least one of Ar and Ar' contains a diaryl ether linkage.

The phenylene and polynuclear aromatic moieties can contain substituents on the aromatic rings. These substituents should not inhibit or otherwise interfere with the polymerization reaction to any significant extent. Such substituents include, for example, phenyl, halogen, nitro, cyano, alkyl, 2-alkynyl and the like.

Poly(aryl ether ketones) having the following repeat units (the simplest repeat unit being designated for a given polymer) are preferred:

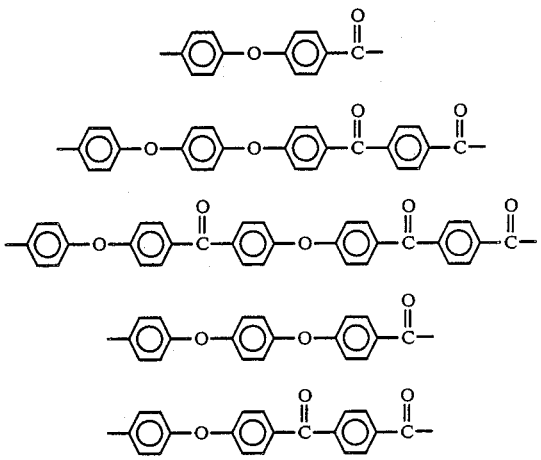

Poly(aryl ether ketones) can be prepared by known methods of synthesis. Preferred poly(aryl ether ketones) can be prepared of Friedel-Crafts polymerization of a monomer system comprising:
(I) (i) phosgene or an aromatic diacid dihalide together with
(ii) a polynuclear aromatic comonomer comprising:
(a) H—Ar"—O—Ar"—H
(b) H—(Ar"—O)$_n$—Ar"—H wherein n is 2 or 3
(c) H—Ar"—O—Ar"—(CO—Ar"—O—Ar"-)$_m$—H wherein m is 1, 2 or 3 or
(d) H—(Ar"—O)$_n$—Ar"—CO—Ar'-'—(O—Ar")$_m$—H wherein m is 1, 2 or 3, and n is 2 or 3 or
(II) an acid halide of the formula:
H—Ar"—O—[(Ar"—CO)$_p$—(Ar"—O)$_q$—(Ar'-'—CO)$_r$]$_k$—Ar"—CO—Z wherein Z is halogen, k os 0, 1 or 2, p is 1 or 2, q is 0, 1 or 2 and r is 0, 1 or 2; or
(III) an acid halide of the formula:
H—(Ar"—O)$_n$—Ar"—Y wherein n is 2 or 3 and Y is CO—Z or CO—Ar"—CO—Z where Z is halogen;

wherein each Ar" is independently selected from substituted or unsubstituted phenylene, and substituted and unsubstituted polynuclear aromatic moieties free of ketone carbonyl or ether oxygen groups, in the presence of a reaction medium comprising:

(A) A Lewis acid in an amount of one equivalent per equivalent of carbonyl groups of present, plus one equivalent per equivalent of Lewis base, plus an amount effective to act as a catalyst for the polymerization;
(B) a Lewis base in an amount from 0 to about 4 equivalents per equivalent of acid halide groups present in the monomer system; and
(C) a non-protic diluent in an amount from 0 to about 93% by weight, based on the weight of the total reaction mixture.

The aromatic diacid dihalide employed is preferably a dichloride or dibromide. Illustrative diacid dihalides which can be used include, for example

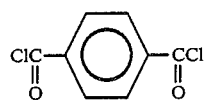

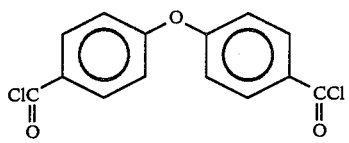

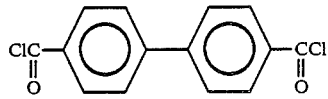

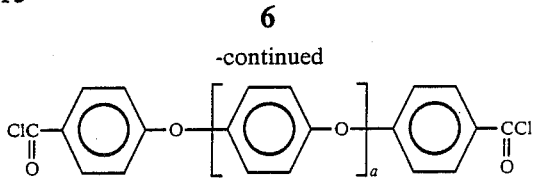

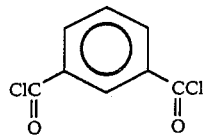

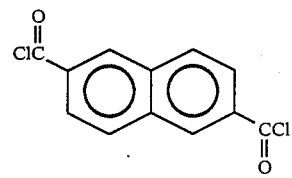

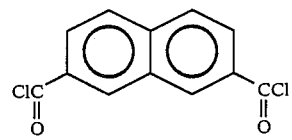

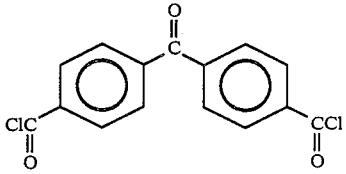

wherein a is 0-4.

Illustrated polynuclear aromatic comonomers which can be used with such diacid halides are:

(a) H—Ar"—O—Ar"—H, which includes, for example:

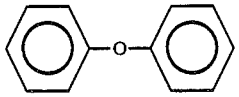 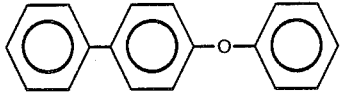

(b) H—(Ar"—O)$_n$—Ar"—H, which include, for example:

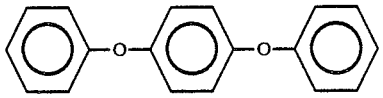

and

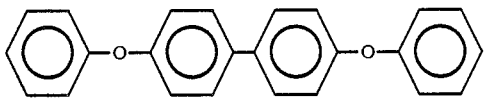

(c) H—Ar"—O—Ar"—(CO—Ar"—O—Ar")$_m$—H, which includes, for example:

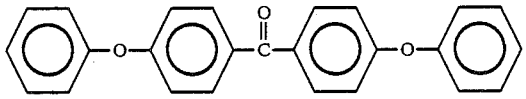

and (d) H—(Ar"—O)$_n$—Ar"—CO—Ar"—(O—Ar")$_m$—H which includes, for example:

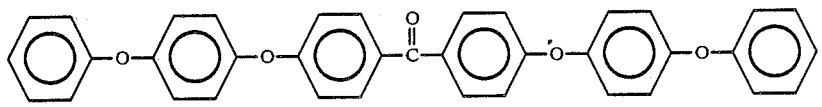

Monomer systems II and III comprise an acid halide. (The term acid halide is used herein to refer to a monoacid monohalide.) In monomer system II, the acid halide is of the formula:

H—Ar''—O—[Ar''—CO)$_p$—(Ar''—O)$_q$—(Ar'-'—CO)$_r$]$_k$—Ar''—CO—Z

Such monomers include for example, where k=0

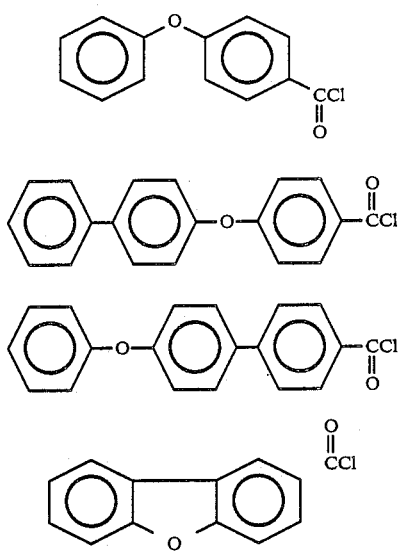

and where k = 1

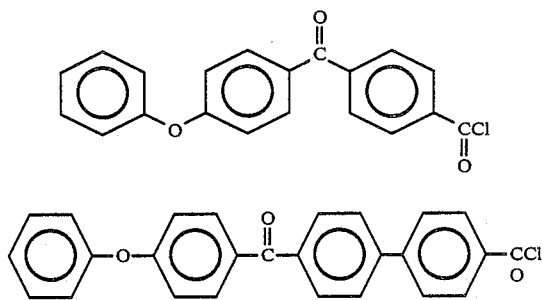

In monomer system III, the acid halide is of the formula

H—(Ar''—O)$_n$—Ar''—Y

Examples of such acid halides include

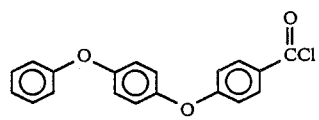

and

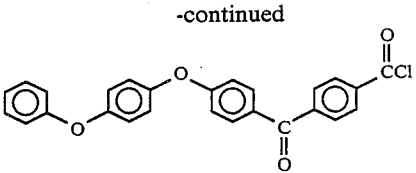

It is to be understood that combinations of monomers can be employed. For example, one or more diacid dihalides can be used with one or more polynuclear aromatic comonomers as long as the correct stoichiometry is maintained. Further, one or more acid halides can be included. In addition monomers which contain other linkages such as those specified above, can be employed as long a one or more of the conomoners used contains at least one ether oxygen linkage. Such comonomers include for example:

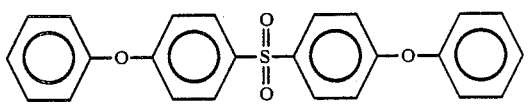

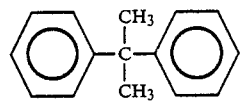

which can be used as the sole comonomer with an ether containing diacid dihalide or with phosgene or any diacid dihalide when used in addition to a polynuclear aromatic comonomer as defined in I(ii)(a), I(ii)(b), I(ii)(c) or I(ii)(d). Similarly

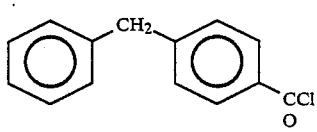

can be used as a comonomer together with an ether-containing polynuclear aromatic acid halide or as an addition comonomer together with a monomer system as defined in I.

The monomer system can also contain up to about 30 mole % of a comonomer such as a sulfonyl chloride which polymerizes under Friedel-Crafts conditions to provide ketone/sulfone copolymers.

Further details of this process for producing poly(aryl ether ketones) can be found in commonly assigned co-pending U.S. application Ser. No. 594,503, filed Mar. 31, 1984, the disclosure of which is incorporated herein by reference.

The polyetherimides suitable for use in this invention are well known in the art and described in, for example, U.S. Pat. Nos. 3,847,867, 3,838,907 and 4,107,147 incorporated herein by reference. A preferred polyetherimide has the structure:

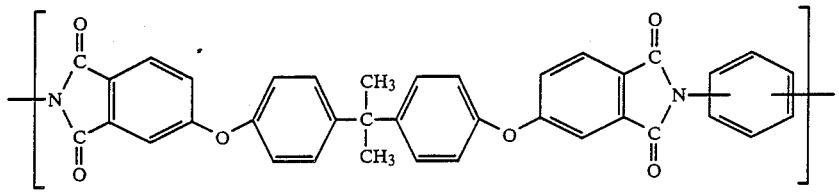

For example, one or more polyetherimides and one or more polyetherketones can be present in the blend to provide the desired physical properties of the final article. The polymers or co-polymers can be used in any of the various commercial grades which may vary in average molecular weights, molecular weight distributions and may contain minor amounts of comonomer residues and the like.

Blends of molecularly compatible polymers are characterized in that they comprise a single amorphous phase although individual polymers may have both an amorphous portion and a crystalline portion where any crystalline portion may exist as a separate phase. One aspect of this degree of compatibility is that the amorphous phase exhibits a single glass transition temperature as defined above.

Blends suitable for use in preparing articles in accordance with this invention comprise preferably from about 5 to about 95 weight percent of one of the molecularly compatible components preferably and from about 95 to about 5 weight percent of the second molecularly compatible component (either of the components can comprise more than one polymer as indicated above). In making the articles of this invention, the blend is formed into the desired shaped article and the article is treated with a solvent which is a solvent for one of the polymers and a non-solvent for the other. At least a portion of the soluble polymer dissolves in the solvent and is removed from the blend on removal of the solvent. The polymer soluble in the solvent is referred to as the leachable component and the polymer removed by the process is referred to as the polymer leached out or extracted from the blend or article. The amount of leachable component utilized depends on the proposed use of the final shaped article. Generally either polymer may be leached out as desired by selecting the appropriate solvent. In a preferred embodiment, the non-leached polymer should be in a partly crystalline state. This has been found to be particularly advantageous in preparing microporous articles of this invention to reduce or control shrinkage of the pore size of the article.

The weight percent of the polymer component to be leached out is generally in the amount of from about 10% to about 90% and preferably from about 30% to about 70%, by weight based on the combined weight of the molecularly compatible polymers.

The blends can contain various additives in addition to the molecularly compatible polymer components in order to give any desired property to the non-leached polymer. For example, stabilizers, flame retardants, pigments, plasticizers, and the like can be present. Other polymers may also be added to give a desired property.

The blends can be prepared by any convenient technique. For example, the components can be mixed on a two-roll mill, in an internal mixer such as a Brabender mixer or Banbury mixer, or in a twin-screw extruder. They may also be prepared by precipitation from a solvent, or case from solution or the like.

The shaped article can be formed by known techniques depending on the desired shape. Films of the blend can be formed by extrusion or casting, hollow fibers by melt spinning or the like. Other articles may be injection molded, compression molded, pour molded, blow molded or the like.

The shaped article is treated with a solvent which should not substantially dissolve, extract or leach one of the compatible components, i.e. it must be a "non-solvent" for said polymer. The non-solvent may, however, within the scope of the invention, cause the non-leached component to swell while in said solvent. Further, it is within the scope of the invention that the non-solvent may remove low molecular weight fractions of the non-leached component. If it is desirable that a particular solvent be used but it is a solvent for both components, one of the components may be rendered non-soluble by crosslinking the polymer using known method such as irradiation or chemical curing for example. It is necessary of course that the polymer involved be crosslinkable. Treatment with the solvent preferably takes place by immersing the shaped article in a bath containing the solvent. The shaped article is immersed in the bath for a period of time sufficient to remove the desired amount of the soluble polymer. Generally, the shaped article will be maintained in contact with the solvent for about 1 min. to about 8 hours or more, preferably from about 10 min. to about 4 hours. Alternatively the article may be suspended in the vapors of the boiling solvent.

The temperature at which the solvent treatment step is carried out depends on the solvent used and the polymer system utilized. In most instances the solvent will be maintained at temperatures from about ambient temperature to about the boiling point of the solvent.

Those skilled in the art will readily be able to select solvents which are non-solvents for at least one of the compatible polymer components. For example, methylene chloride at ambient temperature could be used to leach polymethylmethacrylate (PMMA) from a polyvinylidinefluoride ($PVF_2$)/polymethymethacrylate blend or methylene chloride at 40°–50° C. could be used to leach polyetherimide from polyetherimide/polyetherketone blends. Other examples are polyetherimide removed from poly(ether ketone) by dimethyl formamide at 100° C. and PMMA removed from $PVF_2$ with refluxing toluene.

In preparing microporous articles of this invention, the proportion of soluble polymer component utilized in the blend and the amount of that polymer which is leached out depends on the desired degree of porosity and other properties desired of the final article. Generally, it is desirable to leach out substantially all of the soluble polymer resulting in an article having the physical and mechanical properties of the non-soluble polymer. In certain circumstances, however, it may be advantageous to leach out a portion only of the soluble polymer. Presence of the soluble polymer can, for example, result in an article of greater flexibility, greater wettability or the like than exhibited by an article substantially free of the non-soluble polymer. Generally, however the final porous shaped article should contain no more than about 5 weight percent, based on the weight of the porous shaped article, of the soluble polymer.

It is not necessary to remove the solvent to use the microporous articles of the invention. For example, a membrane article of the invention leached with dimethyl formamide (DMF) may be placed directly in an aqueous solution for filtration purposes without removal of the solvent involved. Optionally however, the solvent is removed from the article. The removal can be accomplished by continuous removal e.g. distillation while the article is being treated by the solvent or subsequent to the completion of extraction by evaporation, vacuum, heat, filtration, freeze drying or any other technique known to one skilled in the art for removal of solvents.

Where the leaching solvent may weaken, cause to shrink or otherwise change the non-soluble polymer it may be desirable to "exchange" solvents in order to prevent such an occurrence. After treatment with the solvent, the treating solvent and dissolved polymer is removed from the shaped article by washing the shaped article with a second solvent. The second solvent is miscible with the first and on washing with the second solvent the treating solvent and dissolved polymer is removed. The porous member can then be dried if desired to remove the second solvent. The selection of the second solvent depends on the first solvent used for leaching (and the nature of the polymer component being leached from the shaped article).

Further, the result of any shrinkage when the solvent is optionally removed is to reduce the porosity or pore size of the article. Since porosity of the article is the desired property sought in the prepartion of the article, steps should be taken to eliminate or control shrinkage of the article. This can be achieved by clamping the article during the porosity forming steps, replacing the leaching solvent with one which is less plasticizing to the non-soluble polymer (as described above), annealing the article before or after removal of the solvent, or freeze drying of the solvent. In general the shrinkage of the article advantageously may be from about 10 to 30%.

Articles of the invention will have an average pore size preferably from about 0.005 microns to 1 micron in diameter, more preferably from 0.01 microns to 0.1 microns. However, the average pore size will be determined as desired, by for example, selection of the amount of polymer leached out, the contact time for the solvent, the solubility of the polymer in the solvent, the amount of polymer originally in the article, the above being readily ascertainable by one skilled in the art.

Membranes may be made from about 1 micron to about 500 microns thick and preferably from about 10 to about 100 microns thick. Films used in the manufacture of membranes of the invention refer to sheets or flat objects of optional width and length and a thickness of not greater than about 250 microns. Membrane articles of the invention are desirable as they would not require mechanical support as, for example, an inversion cast microfilter would.

Mercury intrusion porisimetry is used to measure pore size as described by H. M. Roatare under the title "A Review of Mercury Porisimetry" in "Advance Experimental techniques in Powder Metallurgy" (Perspect Powder Met. (1970 225-252 (Plenum Press)).

In utilizing articles of this invention as "recoverable" or shrinkable articles, the articles may or may not remain porous depending on the amount of shrinkage of the article, but in general the articles will be especially useful in light weight manufacture when returning some degree of their porosity. Other articles will be useful for their polymeric properties and high recovery force. This recovery force is in the area of about 500 psi to 4000 psi depending on the polymers used. The articles may be useful as light weight protective and/or joining device, or as a method of attached a polymeric article to a substrate without adhesives or the like. This would be especially useful for example in the manufacture of airplane parts, which could be left porous or semiporous, and recovered around a substrate for mounting, coupling, attaching or clamping purposes, especially complex shapes such as screws or random shapes.

In order to practice the invention the recoverable article should be kept in the solvent until ready to use. The article is then removed from the solvent, placed around a substrate and the solvent removed. Alternately, where the article absorbs substantial quantities of the solvent the article could be kept with just the amount of solvent being held by the article in a containing which is essentially impervious to the solvent under the environmental conditions pertaining until such time as the article is ready to be used. Alternately, the article can be placed around the substrate prior to treatment with a solvent.

To recover the final recovery (or shrunk) shaped article, the article is placed about the substrate and the solvent is removed by evaporation, or any other method well known to those skilled in the art for removal of solvents. If evaporation is used, it is preferred that the solvent be of volatile nature in order to expedite evaporation.

Where the leaching may weaken or cause to shrink to too great a degree or otherwise change the non-soluble polymer it may be necessary to "exchange" solvents in order to prevent such an occurrence. After treatment with the solvent, the treating solvent and dissolved polymer is removed from the shaped article by washing the shaped article with a second solvent. The second solvent is miscible with the first, and on washing with the second solvent the treating solvent and dissolved polymer is removed. The member may be recovered by removing the second solvent. The selection of the second solvent depends on the treating solvent used (and the nature of the polymer component being leached from the shaped article).

In preparation of recoverable shaped articles from molecularly compatible polymers in the manner described steps can be taken if desired to substantially control shrinkage of the article. This can be achieved by clamping the article during the porosity forming steps, replacing the leaching solvent with one which is less plasticising to the non-soluble polymer (as described above for "exchange of solvents"), annealing the article before or after removal of the solvent, or removing of the solvent by freeze drying.

The following examples are representative of the invention but are not intended to be limiting. Substitution of materials, and conditions which are obvious from this disclosure are with the contemplation of the invention.

EXAMPLE 1

The following materials were used to prepare microporous films.

Ultem D2000 (General Electric)—a high molecular weight poly(etherimide) which is amorphous and melt-processable.

Vitrex PEEK (ICI Americas) poly(carbonyl-p-phenylene-p-oxy-phenylene-p-oxy-phenylene)—a high molecular weight poly(etherketone), which is semi-crystalline and melt processable.

The PEEK and Ultem resins were dried in air circulating ovens at 150° C. for a minimum of four hours before processing. Blends from 10 to 90 pecent of each component by weight were then compounded on counter-rotating twinscrew extruder. The extrusion conditions were as follows.

| | |
|---|---|
| Zone #1 | 330° C. |
| Zone #2 | 340° C. |
| Zone #3 | 350° C. |
| Zone #4 | 350° C. |
| Zone #5 | 360° C. |
| Zone #6 | 370° C. |
| Die | 380° C. |
| Screw Speed | 75 rpm |

A one-hole die was used on the extruder and the emerging strand was passed through a water bath and then pelletized.

Differential scanning calorimetry was used to determine if molecular compatability had been achieved. Table #1 lists the Tg's recorded on the DSC for various composition. The DSC's were recorded on the second heating scan at 20° C./minute.

| Composition (weight %) | | |
|---|---|---|
| PEEK | / Ultem | Tg (°C.) |
| 100 | 0 | 150 |
| 90 | 10 | 160 |
| 80 | 20 | 164 |
| 70 | 30 | 169 |
| 60 | 40 | 178 |
| 50 | 50 | 189 |
| 40 | 60 | 195 |
| 30 | 70 | 204 |
| 20 | 80 | 211 |
| 10 | 90 | 220 |
| 0 | 100 | 222 |

The molecular PEEK/Ultem blends were redried and then blown into film using a ¾" Brabender Extruder equipped with a circular blown film die. Four inch diameter tubes were formed with various wall thickness ranging from 0.0005" to 0.010". The films were transparent and had a slight yellow tint.

EXAMPLE 2

Sections were cut from the films blown in Example 1 and their weight recorded. Then they were placed into a resin kettle containing dimethyl formamide (DMF) which was fitted with a thermometer and condenser. The kettle was heated to 100° C. for two hours. The resulting films were white and opaque indicating they were porous. The weight changes of the films are listed below.

| Initial Concentration | | |
|---|---|---|
| % PEEK / | % Ultem | % Weight Loss |
| 70 | 30 | 27% |
| 60 | 40 | 36% |
| 50 | 50 | 48% |
| 40 | 60 | 58% |
| 30 | 70 | 67% |

EXAMPLE 3

After extracting the material of Example 1 in DMF (conditions stated in Example 2), a solvent exchange procedure was followed to minimize shrinkage. The first step was to transfer the solvent filled PEEK film into a non-plasticizing solvent such as ethanol. The sample was allowed to soak for an hour or until the ethanol displaced the DMF in the membrane. The film was then placed into water at which time it floated until the water displaced the ethanol, at which time the sample sank to the bottom. The water filled membrane was then vacuum dried with very little shrinkage occurring. For 0.005" 40% PEEK/60% Ultem samples that have been extracted using the procedure of Example 2 typical volume shrinkage was 42 to 51 percent. After using the solvent exchange procedure described in this Example typical volume shrinkage was 8 to 12 percent.

EXAMPLE 4

The following materials were used to form polyvinylidene fluoride/(PVF$_2$) polymethylmethacrylate (PMMA) blends.

Kynar (Rohm and Haas)—a high molecular weight PMMA which is melt processable.

Solef 1012 (Solvay Corp.)—a high molecular weight PVF$_2$ which is melt processable.

A 70% PVF$_2$/30% PMMA blend was mixed in a Brabender Plasticorder at 200° C. The molten polymer was removed from the mixing bowl and immediately compression molded into a flat slab at 200° C. and then cooled in a cooling press. The resulting slab was 0.020" thick and was transparent.

EXAMPLE 5

One inch squares PVF$_2$/PMMA were cut from the slabs described in Example 4. The slabs were weighed and then extracted in both boiling under reflux methylene chloride at room temperature and toluene. Weight losses ranged from 26 to 28 percent. The samples were opaque and white indicating porosity.

EXAMPLE 6

Mercury intrusion porosimetry (MIP) was done on blends of 55% PEEK/45% Ultem that were extracted by the methods detailed in Example 3. The MIP results confirmed a voided structure with an average pore size of 0.03 microns. The largest pores detected were 0.07 microns.

EXAMPLE 7

A Scanning Electron Microscope Study on the membranes formed in Example 3 and 5 was undertaken. Extracted 60% Ultem/40% PEEK membranes exhibited a very fine porous structure visible above 20,000X. Pore sizes were measured at less than 0.1 microns. The extracted PVF$_2$ membrane from Example 5 had pores of about 0.1 microns in diameter. The surface structure show pore of fairly even size and distribution.

EXAMPLE 8

Diffusion of KOH through an extracted PEEK/Ultem membrane was examined. A cell was constructed with a resevoir of dilute potassium hydrooxide of pH 12 separated from a reservoir of dilute hydrochloric acid of pH 2 by an extracted 40% PEEK/60% Ultem membrane. The pH change was monitored as a function of time on the acidic side using a pH meter. Equilibrium was reached in approximately four hours. This shows the permeability of the material.

EXAMPLE 9

$PVF_2PMMA$ blends were prepared as described in Example 2. Strips of the blend were measured and weighed, then placed into refluxing toluene or methylane chloride for four hours to remove the PMMA.

Once the solvent had cooled to ambient temperature the strips were removed and quickly clamped into the jaws of an Instron tensile testing machine. The jaw separation was held constant and the force the sample applied was measured as a function of time. As the solvent evaporated the force increased and then leveled off to a constant value when the evaporation was completed. The following Table lists these results.

| Solvent | B.T. | Average Weight Loss (%) | Average Stress Generated (PSI) |
| --- | --- | --- | --- |
| Toluene | 110.7 | 28.6 | 710 |
| Methylene Chloride | 40.1 | 31.6 | 852 |

EXAMPLE 10

A cylinder with a diameter of 0.125 inches and length of 0.50 inches was machined from an injection molded bar of 60% PEEK/40% Ultem. A 0.0012 inch hole was bored longitudinally through the cylinder. This specimen was extracted in PMF for four hours then allowed to cool in the solvent.

Two 200 micron plastic clad silica fiber optics (Maxlight Corp.) were cleared and then 0.25 inches of cladding was stripped from their ends. The extracted cylinder was then removed from the solvent and the fibers were inserted into the opposite ends until the cladding touched the cylinder. As the solvent evaporated the cylinder recovered onto the fibers, aligning them and applying force to hold them in place. A white light source was applied to one fiber end and could be detected visibly through the other end.

We claim:

1. A microproous article comprising a poly(aryl ether ketone), said article having an average pore size of about 0.005 to about 1 micron.

2. An article according to claim 1 wherein the poly(aryl ether ketone) is poly(carbonyl-p-phenylene-p-oxy phenylene-p-oxy-phenylene.

3. An article according to claim 1 wherein the poly(aryl ether ketone) has a repeat unit selected from the group consisting of

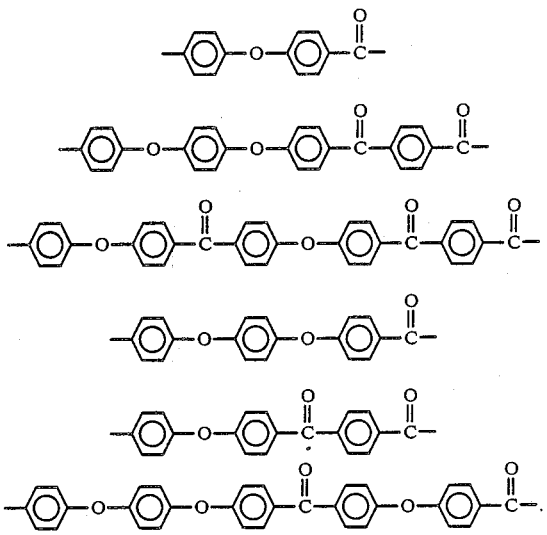

* * * * *